Sept. 4, 1923.  1,466,884
A. McDOUGALL
PREPARING AND TRANSPORTING PEAT OR OTHER GRANULAR MATERIAL HYDRAULICALLY
Filed Oct. 3, 1921
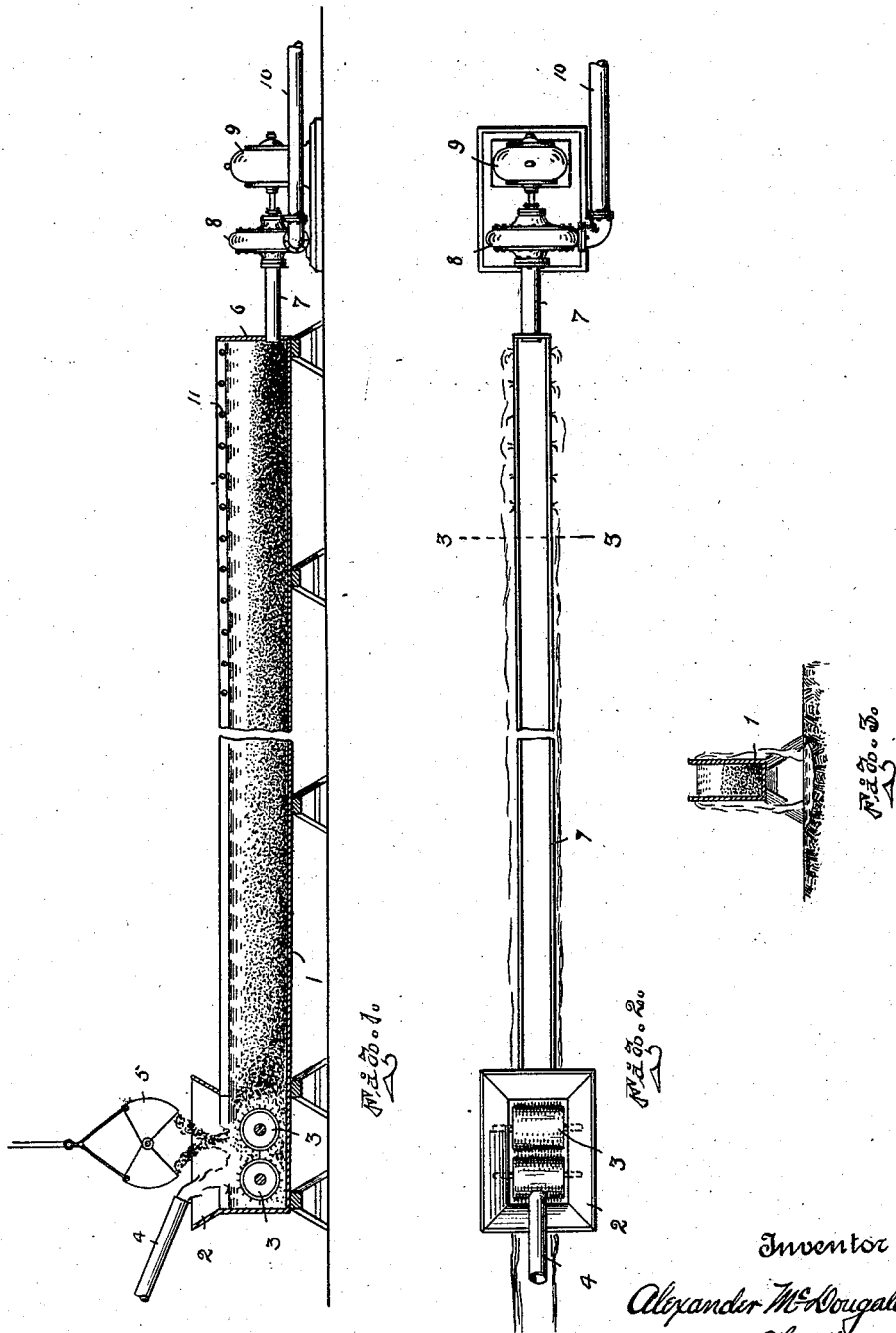

Patented Sept. 4, 1923.

1,466,884

UNITED STATES PATENT OFFICE.

ALEXANDER McDOUGALL, OF DULUTH, MINNESOTA.

PREPARING AND TRANSPORTING PEAT OR OTHER GRANULAR MATERIAL HYDRAULICALLY.

Application filed October 3, 1921. Serial No. 504,879.

*To all whom it may concern:*

Be it known that I, ALEXANDER Mc-DOUGALL, a citizen of the United States, residing at Duluth, in the county of St. Louis and State of Minnesota, have invented certain new and useful Improvements in Preparing and Transporting Peat or Other Granular Material Hydraulically, of which the following is a specification, reference being had therein to the acompanying drawing.

This invention relates to the transportation or conveying of granular material and has special reference to the handling of such material as peat or the like where it is desirable to convey same some considerable distance at the least expense possible.

Peat is frequently found in low lying tracts of land in semi or wholly submerged and marsh like condition where it becomes convenient for associating water therewith for various purposes, or water may be made available for utilization of my present invention where the peat to be had is in dry and more granular or mass conditions.

The principal object of my present invention is the providing of means for more thoroughly preparing the peat for such form and method of transportation.

Other objects and advantages of the invention will appear in the further description thereof.

Referring to the accompanying drawing forming part of this application in which like reference characters indicate like parts:

Figure 1 is a vertical central sectional view through one of the devices embodying my invention, Figure 2 is a top plan view of one of the complete devices, and, Figure 3 is a transverse sectional view on the line 3—3, Figure 2.

In carrying out the invention, I prefer to employ a long narrow and deep trough 1 of any preferred construction and through which a mixture of water and peat may be conveyed, for which purpose I prefer to have the trough inclined slightly downwardly towards the discharge end thereof.

At the upper end of the trough is provided a hopper like receiver 2 extending upwardly therefrom beneath which and within the trough are two horizontally spaced crushing or disintegrating rollers 3, they being provided with suitable spiked teeth or corrugations, or a combination of both, for crushing and disintegrating the peat as it is discharged onto them through the hopper. These rollers may be given rotative motion from any source of power desired, as is obvious, for the purpose intended.

Peat and water are discharged into the hopper 2 either by means of a suitable pipe 4 and dipper or other bucket 5, or, if the conditions are convenient for such, the supply of peat and water may be wholly provided by an hydraulic apparatus: or again the granular material may be supplied wholly by some other form of conveyor, and the water alone provided through a pipe line, the principal object being to supply the water and peat together into the upper end onto the rollers where the peat will become thoroughly disintegrated and crushed by the action of the rollers as well as thoroughly mixed with the water so that it will be conveyed thereby longitudinally and downwardly of the trough. In practice it is intended to provide sufficient water to keep the trough practically filled at all times so that in its traversing the trough the peat will gradually settle towards the bottom thereof and become thicker as it approaches the lower discharge end, allowing the clearer water to remain near the surface as it approaches the lower end of the trough.

This termination of the trough is provided with a closed end 6 through which extends the receiving end 7 of the conveying pipe line which may be so located as to conduct the mixture thus provided by gravity to the place of deposit desired. One or more centrifugal pumps 8 may be installed within the pipe line at any place convenient to provide the necessary power for conveying the peat and water in the pipe, if gravity is not sufficient for such purpose, and such pumps may be mechanically operated as desired, a directly connected electric motor to the pump 8 being shown at 9, and the discharge or continuation of the pipe line from the pump being shown at 10.

Adjacent the upper edge of the trough and near the lowermost end thereof I have provided a number of holes or openings 11 through which the clear water in the trough may overflow and be conveyed in a suitable trench upon the ground beneath the trough or otherwise back to the place of original water supply which is furnished to the trough so that in the event such water supply may be otherwise inadequate no water is wasted, also that any material not having settled within the trough and being conveyed by such overflow of water may be saved.

It is evident from the above that the supply and discharge from the trough may be easily regulated to result in the desired separation of the water and material in the trough, and the proper proportion thereof which may be admitted to the conveying pipe line, so that the largest proportion possible of peat may be conveyed through said pipe with the least amount of water and it being thoroughly disintegrated or pulverized and mixed with the water will provide against any possible clogging or stoppage in the pipe so long as the water is kept in motion therein.

In this manner great quantities of such light granular material may be conveniently conveyed, and the use of such a device results in the most economical form of transporting peat.

Having thus described my invention, what I claim and desire to secure by Letters Patent, is:

1. A device for the preparation of granular material for hydraulic transportation comprising an elongated narrow deep inclined trough, material disintegrating means within the upper end of the trough, a water and material supply adjacent said means, a conveying pipe attached to the lower end of the trough and adjacent the bottom thereof for receiving the heavier and thicker contents of the trough, and discharge openings adjacent the upper edge of the trough for the discharge of separated water from where it may be returned for subsequent use.

2. A device for the preparation of granular material for hydraulic transportation comprising an elongated inclined trough, mixing and disintegrating means within the upper end of the trough, a water and material supply to the mixing and disintegrating means, a discharge opening at the lower end of the trough and adjacent the bottom thereof for removing only the thicker material therefrom, and a plurality of spaced overflow openings along the upper edges of the trough for the purpose described.

In testimony whereof I hereunto affix my signature in the presence of one witness.

ALEXANDER McDOUGALL.

Witness:
   S. C. BRONSON.